April 12, 1966 M. C. JOHNS 3,245,743

TELEPHONE DIRECTORY STAND

Filed May 21, 1964

INVENTOR:
Meredith C. Johns

By Smyth, Roston & Pavitt
Attorneys 3,245,743

TELEPHONE DIRECTORY STAND

Meredith C. Johns, 612 S. Russell, Monterey Park, Calif.

Filed May 21, 1964, Ser. No. 369,112
4 Claims. (Cl. 312—320)

Figure 1:
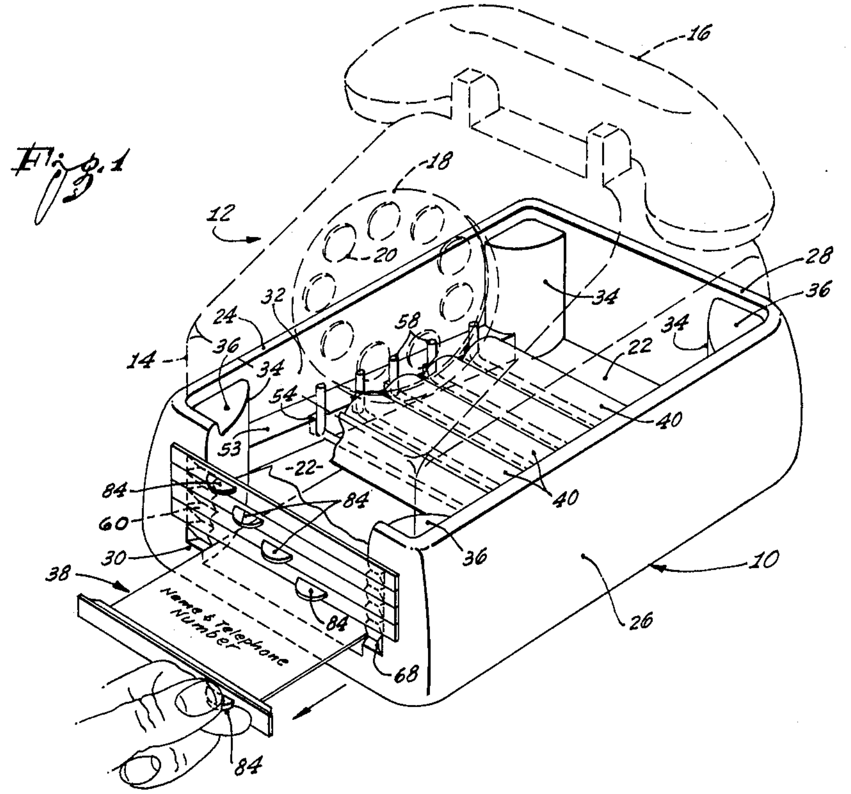

The present invention relates to telephones and more particularly to means for facilitating the use of conventional cradle-type telephones.

A large majority of the telephone systems in this country are of the automatic dialing-type wherein each subscriber is assigned a particular telephone number and each telephone includes a manually operable dial for dialing such numbers. In order to be connected with a particular telephone, it is necessary for the telephone originating the call to be correctly dialed with the number of the terminating telephone. Substantially, all of the subscribers to a system are listed in a so-called telephone book whereby the telephone number of a particular subscriber may be determined by referring to the telephone book. Although this provides a complete and accurate source of the telephone numbers, the telephone book is not always conveniently located with respect to the telephone. Moreover, in some of the larger metropolitan areas, the telephone book is very large and bulky or there are a large number of separate volumes. As a consequence, it is very frequently inconvenient and time consuming to locate the telephone phone and then locate the telephone number of a particular subscriber therein.

Normally, a very large portion of the telephone calls originating from any particular telephone are directed to a relatively small number of telephones. This results in a repetitive use of a correspondingly small volume of telephone numbers. In order to facilitate ready access to this small volume of telephone numbers, numerous types of reference directories have been devised and used. These directories include a plurality of cards or pages upon which the numbers, etc. may be recorded. Although such reference directories are more convenient and quicker to use than a normal telephone, they are not always conveniently located with respect to the telephone. In addition, it has also been found that for many applications the capacity of the reference directory is too limited. Moreover, since the reference directories normally employ special cards, etc., it is inconvenient and uneconomical to frequently update the reference directory by changing or replacing the various telephone numbers recorded thereon.

The present invention overcomes the foregoing difficulties by providing means for recording a large number of means and associated telephone numbers, which are easy and convenient to use and may be readily updated so as to add, replace or change names and numbers. This is accomplished by providing a combination telephone stand and reference directory which is adapted to support a telephone thereon and to store a large number of names and telephone numbers. The one operative embodiment of the stand disclosed herein includes a plurality of vertical side walls arranged to form an upwardly opening space. A plurality of support surfaces are formed on the walls and in the space whereby the bottom of the telephone may be disposed in the space and the telephone supported by the surfaces. When a telephone is disposed in this position, the upwardly opening space will be closed and its contents concealed. A plurality of roller means are rotatably positioned in the upwardly opening recesses and a storage tape is wrapped around each of the roller means so as to be concealed within the upwardly space. A free end of each tape projects from the stand. By pulling on the free end, the tape will be unwound from the roller means and extended beyond the stand so as to expose a surface upon which names and telephone numbers, etc. are recorded. In the event it is desired to in anyway modify the recorded names and/or numbers, the telephone may be merely lifted from the stand so as to expose the contents of the upwardly opening space and make the roller means readily accessible. As a consequence, the tapes may be conveniently replaced or corrected. However, at all other times, the stand and telephone are "integral" with each other whereby they will be equally convenient to use.

Figure 2:
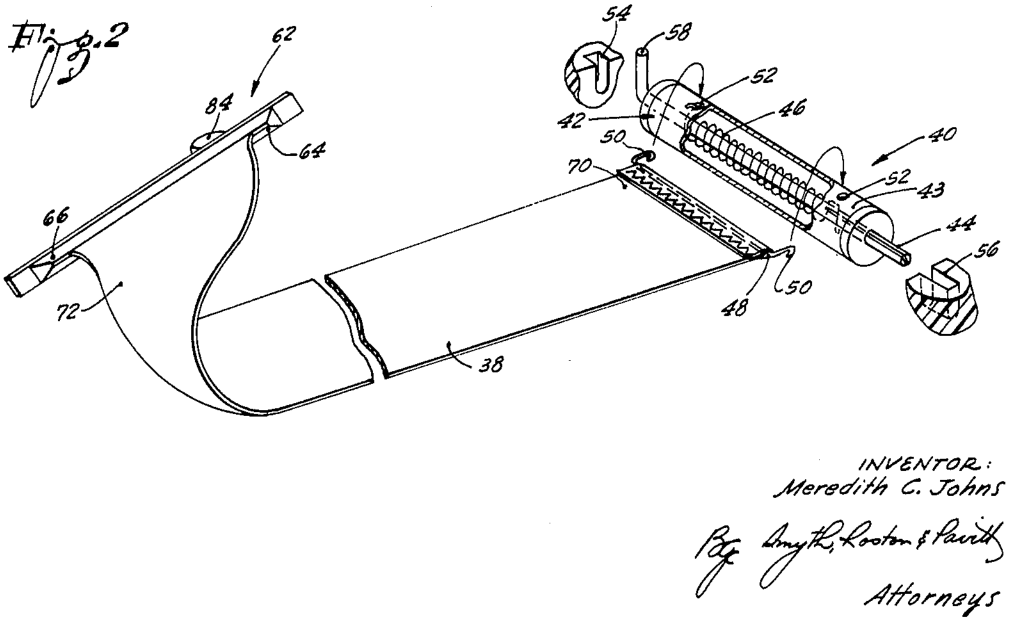

These and other features and advantages of the present invention will become readily apparent from the following detailed description of one operative embodiment of the present invention particularly when taken in connection with the accompanying drawings wherein like reference numerals refer to like parts and wherein:

FIGURE 1 is a perspective view of a combined telephone stand and reference directory embodying one form of the present invention and having a phantom telephone disposed thereon; and FIGURE 2 is an exploded perspective view of a portion of the telephone stand and reference directory of FIGURE 1.

Referring to the drawings in more detail, the present invention is particularly adapted to be embodied in a combination telephone stand and reference directory 10 for use with a conventional telephone 12 of the so-called cradle-type. Such a telephone 12 is shown in phantom in FIGURE 1 and includes a base 14 and a hand-set 16. Normally, the bottom of the base 14 includes four support pads that are disposed adjacent the four corners of the base 14. These pads are designed to rest on a horizontal support surface such as a desk or table top and support the telephone 12.

A dial 18 equiped with ten finger holes 20 may be rotatably mounted on the front of the telephone 12. The finger holes 20 are identified with alphabetic and/or numerical characters corresponding to the possible digits in the telephone numbers. In order to contact a particular telephone, it is necessary to dial a particular combination of digits corresponding to the number of the desired subscribers. This will actuate suitable automatic switching equipment whereby the desired two telephones will be connected with each other.

The telephone stand 10 is adapted to be positioned on a horizontal surface such as a desk or table and beneath the telephone 12. The telephone 12 will thereby be supported in a slightly elevated position above the desk or table top. Although the stand 10 may be fabricated from any desired material, it has been found advantageous to mold the stand 10 from a material such as plastic.

The stand 10 may include a base 22 which is adapted to be positioned upon a support surface such as a table or desk top. If desired, a suitable pad or plurality of pads may be provided on the underside of the base 22 so as to support the base 22 on a table top without damage thereto. A plurality of substantially vertical walls extend upwardly from the base 22. In the present instance, there are a pair of side walls 24 and 26, a rear wall 28 and a front wall 30.

The walls 24, 26, 28 and 30 are all arranged into a rectangular configuration and define an upwardly opening rectangular space 32 therebetween. The exterior surfaces of the walls 24, 26, 28 and 30 may be constructed and arranged so as to aesthetically blend with or complement the base 14 of the telephone 12. The dimensions between the inside surfaces of the walls 24, 26, 28 and 30 may correspond to the exterior dimensions of the base 14 of the telephone 12. This will permit the bottom of the base 14 to just pass between the interiors of the side walls 24, 26, 28 and 30 and fit into the upwardly opening space 32.

Support means such as a gusset 34 may be provided at each of the corners formed at the junctions of the walls 24, 26, 28 and 30. The upper ends of the gussets 34 possess substantially horizontal surfaces 36 that are disposed slightly below the tops of the walls 24 to 30. These surfaces 36 are positioned to engage the bottom of the telephone or the pads thereon when the bottom of the base 14 is lowered between the upper edges of the side walls 24 to 30. As a consequence, the telephone 12 will be firmly supported upon these surfaces. The telephone 12 will thereby be maintained in its normal horizontal position. However, the telephone 12 will be slightly raised or elevated from the horizontal support surface.

When the telephone 12 is seated on the support surfaces 36 provided by the gussets 34, the base 14 of the telephone 12 will just fit inside of the vertical walls 24, 26, 28 and 30 and will thereby be effective to close the top of the upwardly opening space 32. This, in turn, will insure the contents of the space being concealed from view.

In order to store a large quantity of telephone numbers in the stand 10, suitable recording means may be provided. In the present instance, this means includes one or more elongated tapes 38. Although the tapes 38 may be of any desired type of material, it has been found that a strip of good quality, strong paper is well suited for this purpose. The tape 38 provides an elongated writing surface upon which the names and telephone numbers, etc. may be written.

In order to inconspicuously store the tape 38 within the stand 10, suitable roller means 40 may be provided for having the tape 38 wound thereon. In the present instance, this roller means 40 includes a drum 42 having an enlarged cylindrical surface 43 thereon. The diameter of the surface 44 should be sufficiently large to permit the paper to be tightly wound therearound without damaging the paper and also to permit a substantial length of paper to wind on the roller with a minimum number of turns.

The present drum 42 is a hollow member that is mounted on a shaft 44. The drum 42 is concentric with the shaft 44 and is free to rotate about the axis of the shaft 44.

Spring means may be attached to the drum 42 for applying a biasing or rewinding force thereon. In the present instance, the spring means includes an elongated coil spring 46 that is disposed concentrically about the shaft 44 and inside of the drum 42. One end of the spring 46 is attached to the shaft 44 while the other end is attached to the inside of the drum 42.

The foregoing arrangement will permit the drum 42 to rotate freely about the shaft 44 with a predetermined opposing force. The force applied to the drum 42 will be effective to resiliently bias the drum 42 back towards some predetermined angular position.

One end of each of the tapes 36 may be attached to its respective drum 42 by any desired means. In the present instance, a fastener 48 is attached to the end of the tape 36 by some suitable means such as by a pressure-sensitive tape, etc.

The fastener 48 includes hooks 50 on the opposite ends thereof. The hooks 50 are adapted to fit into a pair of corresponding openings 52 in the exterior of the drum 42 and thereby lock the fastener 48 on the drum 42.

Suitable support means may be provided for maintaining the roller means concealed inside of the upwardly opening space 32. The present support means includes a pair of elongated shoulders 53 or similar members that are molded integral with the side walls 24 and 26.

In addition, a pair of mounting means is provided for each of the roller means. Each of the present mounting means includes a pair of recesses 54 and 56 that open upwardly toward the top of the space 32.

When the telephone 12 is not seated on the support surfaces 36, the top of the upwardly opening space 32 will be clear. As a consequence, the roller means including the drums 42 with the tapes 38 wound thereon may be lowered into the space 32 and the opposite ends of the shaft 44 seated in the recesses 54 and 56. This will be effective to maintain the drum 42 and tape 38 disposed transversely across the space 32. One end of each shaft may have a flat surface or bent arm 58 thereon which will fit into the recess 54. This will be effective to anchor the end of the shaft and prevent the shaft 44 from rotating. This, in turn, will anchor the end of the spring 46. As a consequence, when the tape 38 is unwound from the drum 42, the spring 46 will be wound up and when the tape 38 is released, the drum 42 will be rotated so as to rewind the tape 38 thereon.

The front wall 30 of the stand 10 may have one or more openings 60 to permit the free ends of the tapes 38 to pass therethrough. In the present embodiment, a single enlarged opening 60 is provided that extends all the way to the top of the front wall 30. The width of this opening 60 is slightly greater than the width of the tape 38 so as to permit the tape 38 to pass freely therethrough.

The free or outer end of the tape 38 may be attached to a suitable handle 62 so as to facilitate manually manipulating the tape 38. The handles 62 may be molded from a plastic or similar material so as to complement the side walls 24, 26, 28 and 30. The handles 62 are all substantially identical and are adapted to fit in side-by-side relation on the front wall 30. Each of the handles 62 includes a clamp 64 which is effective to be attached to the end of the tape 38. The inside of the handle 62 may include a tapered surface 66 that is adapted to coact with a tapered surface 68 around the opening 60. When the handle 62 is moved into position with the two tapered surfaces 66 and 68 engaging each other, the handle 62 will be accurately positioned in alignment with the surrounding handles.

In order to employ the present invention, the various names, telephone numbers, addresses, etc. which are most commonly referred to may be recorded on tapes 38. The end 70 of the tape 38 may then be attached to the fastener 48 by any suitable means such as a pressure-sensitive tape. Following this, the fastener 48 is attached to the drum 42 by inserting the hooks 50 into the openings 52 in the drum 42. Following this, the tape 38 is wound upon the drum 42 and the handle 62 is attached to the free end 72 of the tape 38. While the telephone 12 is removed from the stand 10 and the interior of the space 32 is readily accessible, the roller means and tape are lowered into the upwardly opening space 32. The opposite ends of the shaft 44 are then positioned in a pair of aligned recesses 54 and 56. The free end of the tape 38 is then inserted through the opening 60 in the front of the stand 10 and the handle 62 positioned in the appropriate portion of the opening 60.

It has been found desirable for the tapes 36 to unwind from the bottom of the drums 42 and for the supports 53 to be inclined upwardly toward the front opening 60. This will insure each tape 38 extending in a straight line from the bottom of a drum 42 to its respective handle 62 and being spaced slightly below the bottom of an adjacent tape 38. Accordingly, when installing the roller means, it is preferable to start with the rear roller means and the lowest handle.

After all of the roller means, tapes 38 and handles 62 are properly positioned, the telephone 12 may again be lowered into the space 32 and seated on the support surfaces 36. All of the roller means and tapes 38 will now be concealed from view. In the event it is desired to determine a particular telephone number, the operator may merely grasp the tab 84 on the correct handle 62 and pull. This will cause the tape 38 to unwind from the drum 42 and expose the writing surface. After the number has been determined, the handle 62 may be released. This will allow the tension in the spring 46 to rotate the drum 42 and rewind the tape 38 thereon until the tape is completely concealed in the stand 10 and the handle 62 is again seated. It should be noted that due to the coacting tapered seating surfaces 66 and 68 the spring tension will be effective to maintain the handle properly positioned at all times.

In the event it is desired to replace any of the tapes 38, the telephone 12 is first lifted from the stand 10 so as to expose the interior of the upwardly opening space 32. The various roller means may then be removed and the tape 38 replaced.

It may be seen that a combination telephone stand and reference directory has been provided that is very easy and convenient to use. Since the telephone 12 is positioned directly on the stand 10, it is essentially an integral part of the telephone 12. As a consequence, the reference directory will always be as convenient as the telephone.

While only a single embodiment of the present invention is disclosed and described herein, it will be readily apparent to persons skilled in the art that numerous changes and modifications may be made thereto without departing from the spirit of the invention. Accordingly, the foregoing disclosure is for illustrative purposes only and does not in any way limit the invention which is described only by the claims which follow.

What is claimed is:

1. A telephone stand for a telephone to support the telephone on a support surface, including the combination of:
- a base positioned upon the support surface,
- a pair of side walls disposed on the opposite sides of said base and substantially parallel to each other to form an upwardly opening space and to support the telephone upon the side walls so as to close said upwardly opening space,
- a front face disposed between the forward ends of said side walls and defining the front of said stand, said face having an opening,
- a plurality of elongated handles each disposed in said opening at a different level in the opening at a different distance from the support surface and being manually removable therefrom,
- a separate support on each of said side walls, said support projecting inwardly into the space and extending along the side wall and away from the front at an angle inclined to the support surface,
- a plurality of pairs of aligned recesses in said supports at positions spaced toward the rear of the supports, the recesses opening upwardly so as to be accessible through the top of the space,
- separate roller means for each pair of aligned recesses, each of said roller means including arms on the opposite ends thereof whereby the roller means may be lowered through said top and into the space with the arms being positioned in the recesses,
- a plurality of receiving drums each disposed on a different one of said roller means,
- a plurality of spring tensioning means each disposed on a different one of the roller means and effective to rotate the drum so as to rewind a tape thereon, and
- a plurality of separate storage tapes each wound on a different one of said drums and being interconnected with an individual one of the separate handles, each of said tapes including a writing surface and being arranged to unwind from its drum and to expose its writing surface.

2. A telephone stand for a telephone to support the telephone on a support surface, including the combination of:
- a base positioned upon the support surface,
- a pair of side walls disposed on the opposite sides of said base in substantially parallel relationship to each other to form an upwardly opening space and to support the telephone upon the side walls so as to close said upwardly opening space,
- a face disposed between the forward ends of said side walls and defining the front of said stand, said face having an opening,
- a plurality of separate elongated handles each disposed in the opening at a different level at a different distance from the support surface and being manually removable therefrom,
- a pair of separate supports each disposed on a different one of said side walls, said supports projecting inwardly into the space and extending away from the front at an oblique angle to the vertical,
- a plurality of separate mounting means in each of said supports at spaced positions toward the rear of the support stands, each of said mounting means including an upwardly opening recess accessible through the top of the space,
- a plurality of separate roller means each associated with a different one of said mounting means, each of the roller means including arms positioned in the recesses,
- a plurality of tape receiving drums and spring tensioning means each associated with a different one of the roller means, and
- a plurality of separate storage tapes each wound on a different one of said drums and extending in a direction parallel to the support surface and interconnected with a different one of the handles, each tape including a writing surface to unwind from its drum to expose the writing surface on the tape and to tension the spring means.

3. A telephone stand for a telephone to support the telephone on a support surface, including the combination of:
- a base positioned upon the support surface,
- a pair of side walls extending from the base and positioned to form an upwardly opening space and to support the telephone upon the side walls so as to close the upwardly opening space,
- a face disposed between the forward ends of said side walls and defining the front of said stand, said face having an opening,
- an alignment surface on said face and adjacent the opening and defined by extremities with tapered configurations,
- a plurality of elongated handles each disposed adjacent the opening at a different distance from the support surface and being manually removable therefrom, each said handle including a tapered surface complementary to said tapered configuration of said associated alignment surface and effective to align the handle with the face when the handle is in the opening,
- a pair of separate supports each extending along a different one of said side walls away from the face, said supports extending inwardly from the side walls and into the space in an oblique configuration relative to the support surface,
- a plurality of roller means each mounted on a different one of said supports so as to extend between the side walls and be disposed within said space,
- a plurality of information storage tapes each wound on a different one of said roller means and interconnected with an individual one of said handles to extend in a direction substantially parallel to the support surface, and
- a plurality of spring tensioning means each associated with a different one of the roller means to rewind the tape thereon and maintain the handle in its opening.

4. A telephone stand for a telephone to support the telephone on a support surface, including the combination of:
- a pair of side walls positioned to form an upwardly opening space and to support a telephone upon the side walls so as to close said upwardly opening space, a plurality of upwardly opening mounting means on said side walls, said upwardly opening mounting means being disposed in spaced relationship to one another toward the rear of the telephone stand and being disposed at individual distances from the support surface, a plurality of separate roller means each disposed in different ones of said mounting means, said roller means being adapted to be lowered into said upwardly opening space when a telephone is not positioned on the side walls, each of said roller means including a tape-receiving portion, handle means disposed at the forward end of the telephone stand and cooperative with the forward end of the telephone stand to be limited in movement toward the rear of the telephone stand, and a plurality of separate storage tapes each wound on a different one of said rollers means and including a writing surface thereon and extending in a direction substantially parallel to the support surface between the roller means and the handle means.

References Cited by the Examiner

UNITED STATES PATENTS

| | | | |
|---|---|---|---|
| 337,095 | 3/1886 | Van Wie | 312—234 |
| 1,660,872 | 2/1928 | Green | 40—85 |
| 1,922,611 | 7/1933 | Adler | 281—14 X |
| 2,283,690 | 6/1942 | Munson | 312—330 |
| 2,522,361 | 9/1950 | Hill | 312—330 |

CLAUDE A. LE ROY, *Primary Examiner.*

CHANCELLOR E. HARRIS, FRANK B. SHERRY, *Examiners.*